US011543682B2

(12) United States Patent
Bercher et al.

(10) Patent No.: US 11,543,682 B2
(45) Date of Patent: Jan. 3, 2023

(54) METHOD FOR EVALUATING AN OPHTHALMIC LENS; ASSOCIATED EVALUATION SYSTEM AND INDUSTRIAL ASSEMBLY FOR MANUFACTURING AN OPHTHALMIC LENS

(71) Applicant: Essilor International, Charenton-le-Pont (FR)

(72) Inventors: Pierre Bercher, Charenton-le-Pont (FR); Jean-Pierre Chauveau, Charenton (FR); Gilles Le Saux, Charenton (FR); Sebastien Fricker, Charenton-le-Pont (FR); Sebastien Maurice, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 185 days.

(21) Appl. No.: 16/652,613

(22) PCT Filed: Sep. 28, 2018

(86) PCT No.: PCT/EP2018/076499
§ 371 (c)(1),
(2) Date: Mar. 31, 2020

(87) PCT Pub. No.: WO2019/068586
PCT Pub. Date: Apr. 11, 2019

(65) Prior Publication Data
US 2020/0241320 A1    Jul. 30, 2020

(30) Foreign Application Priority Data

Oct. 3, 2017 (EP) ..................... 17306323

(51) Int. Cl.
*G02C 7/02*     (2006.01)
*G02C 7/06*     (2006.01)

(52) U.S. Cl.
CPC ............ *G02C 7/027* (2013.01); *G02C 7/028* (2013.01); *G02C 7/061* (2013.01)

(58) Field of Classification Search
CPC ........ G02C 7/027; G02C 7/024; G02C 7/028; G02C 7/04; G02C 7/06; G02C 7/061;
(Continued)

(56) References Cited

U.S. PATENT DOCUMENTS

2011/0270596 A1* 11/2011 Weeber .................... G02C 7/02
703/11
2014/0016088 A1    1/2014 De Rossi et al.
(Continued)

FOREIGN PATENT DOCUMENTS

WO    WO 2014/083392 A1    6/2014
WO    WO 2017/064065 A1    4/2017

OTHER PUBLICATIONS

International Search Report dated Jan. 3, 2019 in PCT/EP2018/076499 filed Sep. 28, 2018.

*Primary Examiner* — Jordan M Schwartz
(74) *Attorney, Agent, or Firm* — Oblon, McClelland, Maier & Neustadt, L.L.P.

(57) ABSTRACT

A method for evaluating an ophthalmic lens for a given wearer according to a visual performance parameter includes providing wearer's data for the given wearer. The method further includes providing a visual performance parameter tolerance range for the wearer. The method further includes providing an ophthalmic lens to be evaluated, the ophthalmic lens being characterized by opto-geometrical features. The method further includes computing a value of the visual performance parameter for the lens to be evaluated on the basis of a model. The method further includes evaluating the ophthalmic lens by comparing the computed
(Continued)

value of the visual performance parameter with the visual performance parameter tolerance range.

14 Claims, 1 Drawing Sheet

(58) Field of Classification Search
CPC ............ G01M 11/02; G01M 11/0228; G01M 11/0235; G01M 11/0242
USPC ................. 351/159.74, 159.75; 356/124
See application file for complete search history.

(56) References Cited

U.S. PATENT DOCUMENTS

| | | | |
|---|---|---|---|
| 2014/0092395 A1* | 4/2014 | Fechner | ............ B29D 11/0098 356/517 |
| 2014/0253907 A1* | 9/2014 | Ignatovich | ......... G01M 11/0285 356/73 |
| 2018/0299696 A1 | 10/2018 | Heslouis et al. | |

* cited by examiner

METHOD FOR EVALUATING AN OPHTHALMIC LENS; ASSOCIATED EVALUATION SYSTEM AND INDUSTRIAL ASSEMBLY FOR MANUFACTURING AN OPHTHALMIC LENS

CROSS-REFERENCE TO RELATED APPLICATION

The present application is a national stage application of PCT/EP2018/076499, filed Sep. 28, 2018, which claims priority to European Patent Application No. 17306323.1, filed Oct. 3, 2017. The benefit of priority is claimed to each of the foregoing, and the entire contents of each of the foregoing are incorporated herein by reference.

BACKGROUND

The invention relates generally to the field of vision improvement and more specifically concerns a method for evaluating an ophthalmic lens. It also relates to an evaluation system and to an industrial assembly for manufacturing an ophthalmic lens.

Ophthalmic lenses are corrective lenses or non corrective lenses worn in front of the eye. Corrective lenses are mainly used to treat myopia, hyperopia, astigmatism, and presbyopia. According to the present invention, ophthalmic lenses refer to "glasses" or "spectacles" and are worn on the face a short distance in front of the eye or also refer to "contact lenses" which are worn on the eyes.

According to an embodiment, the present invention relates to single-vision ophthalmic lenses. According to another embodiment, the present invention relates to multifocal ophthalmic lenses, for example to progressive addition ophthalmic lenses.

Ophthalmic lenses can be manufactured by molding or by surfacing a lens blank or a semi-finished lens blank; lens blanks or semi-finished lens blanks are usually manufactured by molding.

Manufactured ophthalmic lenses are inspected thoroughly before delivery. The quality check may include a visual inspection for example for dust, damage and colour, checking whether each individual ophthalmic lens meets optical and geometrical specifications, for example by measuring refractive power, axis, cylinder, prism, thickness, design, diameter or shape of a manufactured ophthalmic lens.

The inventors have noticed that there is still a need for providing new routes for evaluating an ophthalmic lens for a given wearer so as to improve his visual comfort or wearing satisfaction.

For example, a lens that satisfies ISO optical tolerances may provide significant acuity loss (more than 0.05 logMAR, which is above the sensitivity threshold of an average wearer).

WO 2017/064065 A1 discloses a method for determining a three dimensional performance of an ophthalmic lens comprising the steps of calculating a domain where a condition between a local optical criterion and threshold values is fulfilled, determining the three dimensional performance of the ophthalmic lens according to the said domain, and also a method of calculating an ophthalmic lens comprising said method.

A problem that the invention aims to solve is thus providing a method for evaluating an ophthalmic lens for a given wearer that could take into account data relevant for improving the wearer's visual comfort or wearing satisfaction when performing a quality check of a manufactured ophthalmic lens.

BRIEF SUMMARY

For this purpose, a subject of the invention is a method implemented by computer means for evaluating an ophthalmic lens for a given wearer according to a visual performance parameter (VPP), the method comprising the following steps:
- step (a) of providing wearer's data for the given wearer, the wearer's data comprising at least prescription data,
- step (b) of providing, for the visual performance parameter (VPP), a visual performance parameter tolerance range (VPP1; VPP2) for the wearer,
- step (c) of providing an ophthalmic lens to be evaluated, the ophthalmic lens being characterized by opto-geometrical features,
- step (d) of determining a value (VPPV) of the visual performance parameter (VPP) for the lens to be evaluated on the basis of a wearer visual performance model, the model being a function of the wearer's data, of the opto-geometrical features of the evaluated lens and of at least a gaze direction of the given wearer, and
- step (e) of evaluating the ophthalmic lens by comparing the determined value (VPPV) of the visual performance parameter with the visual performance parameter tolerance range (VPP1; VPP2).

The inventors have demonstrated that such a method for evaluating an ophthalmic lens for a given wearer provides helpful results for improving the wearer's visual comfort or wearing satisfaction. In particular, such a method allows both the control of ophthalmic lenses at the production stage before the delivery of the lenses to the wearer and the control of ophthalmic lenses after the delivery of the lenses to the wearer, for example view weeks later.

According to different embodiments of the method for evaluating an ophthalmic lens of the present invention that may be combined:
- the wearer visual performance model is a mathematical model simulating the lens to be evaluated worn by the wearer, the determined value (VPPV) of step (d) being computed on the basis of said mathematical model;
- step (c) comprises the sub-steps of providing a lens blank or a semi-finished lens blank, and surfacing the lens blank or the semi-finished lens blank as a function of the prescription data so as to obtain the ophthalmic lens to be evaluated;
- step (c) comprises a sub-step of measuring the ophthalmic lens to be evaluated so as to determine the opto-geometrical features relevant for the computing step (d), for example measuring the mean refractive power $PPO(\alpha, \beta)$ and the module of resulting astigmatism $ASR(\alpha, \beta)$ of the ophthalmic lens, where $(\alpha, \beta)$ are gaze directions passing by the center of rotation of the eye (CRE), $\alpha$ being lowering angle in degree and $\beta$ being an azimuth angle in degree, for example by using an interferometer or a Shack-Hartmann measuring device;
- the evaluating step (e) comprises the sub-steps of accepting the ophthalmic lens if the determined value of the visual performance parameter (VPPV) falls within the visual performance parameter tolerance range (VPP1; VPP2), and rejecting the ophthalmic lens if not;
- the wearer's data comprise wearing condition data; said wearing condition data comprise at least one of pantoscopic angle; wrap angle; eye-lens distance (also called vertex distance); according to an embodiment, wearing condition data are defined for a standard wearer; according to another embodiment, wearing condition data are defined for the given wearer, for example according to his viewing preferences or as a function of a chosen spectacle frame;

the method comprises a further step of determining, for example by measurement, the visual performance when the manufactured ophthalmic lens is worn by the wearer according to wearing condition data;

the visual performance parameter (VPP) is chosen in the list consisting of: acuity loss; contrast sensitivity loss; dynamic vision performance loss or a combination thereof, the choice of such combination depending for example on the wishes of the wearer or on his habits;

the visual performance parameter (VPP) is acuity loss, defined by acuity loss value ACU($\alpha$, $\beta$) expressed in logMAR and determined in as-worn conditions of the lens by the wearer, where the visual performance parameter tolerance range (VPP1; VPP2) is for example (0; 0.2), for example is (0; 0.1), or for example is (0; 0.05), where VPP1 and VPP2 are expressed in logMAR;

the visual performance parameter (VPP) is acuity loss and the mathematical model of step (d) relates to calculating acuity loss value according to following: ACU($\alpha_{FP}$, $\beta_{FP}$) is calculated for a fixation point FP($\alpha_{FP}$, $\beta_{FP}$, PROX$_{FP}$) according to mean refractive power PPO($\alpha$, $\beta$) and to module of resulting astigmatism ASR($\alpha$, $\beta$) of the ophthalmic lens and to following equation:

$$ACU(\alpha_{FP},\beta_{FP})=-\log(AC\%(\alpha_{FP},\beta_{FP})/100), \text{ where:}$$

$$AC\%(\alpha_{FP},\beta_{FP})=100-63\times RPE(\alpha_{FP},\beta_{FP})-44.3\times ASR(\alpha_{FP},\beta_{FP})+7.2\times RPE(\alpha_{FP},\beta_{FP})^2+19.5\times RPE(\alpha_{FP},\beta_{FP})\times ASR(\alpha_{FP},\beta_{FP})+ASR(\alpha_{FP},\beta_{FP})^2;$$

$$RPE(\alpha_{FP},\beta_{FP})=PE(\alpha_{FP},\beta_{FP}), \text{when } PE(\alpha_{FP},\beta_{FP})\geq 0; \text{ and;}$$

$$RPE(\alpha_{FP},\beta_{FP})=0, \text{when } PE(\alpha_{FP},\beta_{FP})<0;$$

$$PE(\alpha_{FP},\beta_{FP})=PPO(\alpha_{FP},\beta_{FP})-MS(\alpha_{FP},\beta_{FP})-PROX_{FP};$$

MS($\alpha_{FP}$, $\beta_{FP}$) is the prescribed mean sphere value for the wearer, where MS($\alpha_{FP}$, $\beta_{FP}$)=SPH$_p$($\alpha_{FP}$, $\beta_{FP}$)−[CYL$_p$($\alpha_{FP}$, $\beta_{FP}$)/2]; SPH$_p$($\alpha_{FP}$, $\beta_{FP}$) is the prescribed sphere and CYL$_p$($\alpha_{FP}$, $\beta_{FP}$) is the prescribed astigmatism value CYL$_p$ for the ($\alpha_{FP}$, $\beta_{FP}$) gaze direction;

step (b) of providing a visual performance parameter tolerance range (VPP1; VPP2) comprises a sub-step of measuring, for example with trial lenses, with an aberrometer or with a phoropter, the visual performance parameter tolerance range (VPP1; VPP2) for the wearer;

the model is personalized for the wearer thanks to measuring his sensitiveness to the visual performance parameter;

the visual performance parameter (VPP) is evaluated monocularly; according to another embodiment, the visual performance parameter (VPP) is evaluated binocularly.

In another aspect, the present invention also provides a method implemented by computer means for providing an ophthalmic lens to a wearer comprising the steps of:

i. providing at least a manufactured ophthalmic lens;

ii. evaluating the ophthalmic lens(es) of step i. with a method for evaluating an ophthalmic lens for a given wearer according here above embodiments of the method for evaluating an ophthalmic lens;

iii. deciding whether the ophthalmic lens(es) of step i. is suitable to fulfil visual satisfaction of the wearer in view of the result of step e. of step ii.

According to an embodiment of said method for providing an ophthalmic lens, one provides prescription data and manufactures an ophthalmic lens according to said prescription data to provide one ophthalmic lens in step i., one evaluates said ophthalmic lens in step ii., and in step iii., one delivers said ophthalmic lens if the computed value of the visual performance parameter (VPPV) falls within the visual performance parameter tolerance range (VPP1; VPP2), and rejects the ophthalmic lens if not. According to another embodiment of said method for providing an ophthalmic lens, one provides a plurality of already on stock manufactured lenses in step i., one provides the prescription data and wearing condition data for the wearer and evaluates said ophthalmic lenses in step ii., and comprising a further step iv. of choosing an ophthalmic lens which visual performance parameter value (VPPV) falls within the visual performance parameter tolerance range (VPP1; VPP2). According to still another embodiment of said method for providing an ophthalmic lens, one provides a plurality of already on stock manufactured lenses in step i., one provides the prescription data and wearing condition data for the wearer and evaluates said ophthalmic lenses in step ii., and comprising a further step iv. of choosing, among a plurality of ophthalmic lenses which visual performance parameter values (VPPV) fall within the visual performance parameter tolerance range (VPP1; VPP2), the ophthalmic lens which visual performance parameter value (VPPV) is the nearest from the interval formed by VPP1 and VPP2.

In another aspect, the present invention also provides an ophthalmic lens evaluated by a method according here above embodiments of the method for evaluating an ophthalmic lens.

In still another aspect, the present invention provides a method of evaluating an optical equipment comprising a frame and left and right ophthalmic lenses mounted in said frame for a given wearer, where said method comprises a step of evaluating each of the mounted ophthalmic lenses according to here above embodiments of the method for evaluating an ophthalmic lens.

In still another aspect, the present invention provides an industrial assembly for manufacturing an ophthalmic lens adapted to a given wearer, the assembly comprising:

an ordering system defining manufacturing criteria on the basis of wearer's data comprising at least prescription data, a manufacturing system for manufacturing an ophthalmic on the basis of the manufacturing criteria, and the here above evaluation system for evaluating an ophthalmic lens manufactured by the manufacturing system.

In another aspect, the present invention also provides a computer program product comprising one or more stored sequence of instruction that is accessible to a processor and which, when executed by the processor, causes the processor to carry out the steps of the here above recited method for evaluating an ophthalmic lens or of here above recited method for evaluating an optical equipment. The present invention also provides a computer-readable medium carrying one or more sequences of instructions of the said computer program product.

Unless specifically stated otherwise, as apparent from the following discussions, it is appreciated that throughout the specification discussions utilizing terms such as "computing", "calculating", "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

The features of the present invention, as well as the invention itself, both as to its structure and its operation, will be best understood from the accompanying non limiting drawings and examples, taken in conjunction with the accompanying description, in which.

DETAILED DESCRIPTION

Definitions are provided so as to define the wordings used within the frame of the present invention.

"Wearer's data" refers to data taken into account when the wearer orders his ophthalmic lens(es) and comprises at least prescription data; according to an embodiment, wearer's data also comprise wearing condition data, such as the pantoscopic tilt of the lens or of the frame, the wrap angle of the lens or of the frame and the vertex distance of the lens.

"Prescription data", also called "wearer's prescription", are known in the art. Prescription data refers to one or more data obtained for the wearer and indicating for at least an eye, preferably for each eye, a prescribed sphere $SPH_p$, and/or a prescribed astigmatism value $CYL_p$ and a prescribed axis $AXIS_p$ suitable for correcting the ametropia of each eye of the wearer and, if suitable, a prescribed addition $ADD_p$ suitable for correcting the presbyopia of each of his eyes.

The term "ophthalmic lens" is to be understood to mean any type of known lens intended to be supported by a wearer's face and also to any type of known contact lenses which are worn on the eyes. The term can refer to non-corrective lenses, corrective lenses, such as progressive addition lenses, unifocal, occupational or multifocal lenses. The term can also refer to said ophthalmic lenses which could present at least one added value such as, for example, tint, photochromism, polarization filtering, electro-chromism, antireflective properties, antiscratch properties. The lens may be also a lens for information glasses, wherein the lens comprises means for displaying information in front of the eye.

"Progressive ophthalmic addition lenses" are known in the art. They provide comfortable vision for a presbyopic wearer at all distances.

All ophthalmic lenses of the invention may be paired so as to form a pair of lenses (left eye LE, right eye RE).

"Opto-geometrical features" of an ophthalmic lens are data suitable for providing or calculating the visual effect of the ophthalmic lens when being worn by the wearer.

According to an embodiment, opto-geometrical features of the ophthalmic lens is a set of data and/or equations defining the geometry of both the back surface and of the front surface of said lens, the relative position of the said surfaces and the refractive index between the said surfaces.

According to another embodiment, opto-geometrical features of the ophthalmic lens is a set of data and/or equations defining the optical features of the lens when being worn and for a given ergorama; according to such an embodiment, opto-geometrical features of the ophthalmic lens are data of mean refractive power $PPO(\alpha,\beta)$ and of module of astigmatism $AST(\alpha,\beta)$ according to gaze direction $(\alpha,\beta)$ suitable to map the vision gaze directions of the wearer though the said ophthalmic lens.

Figure 1:
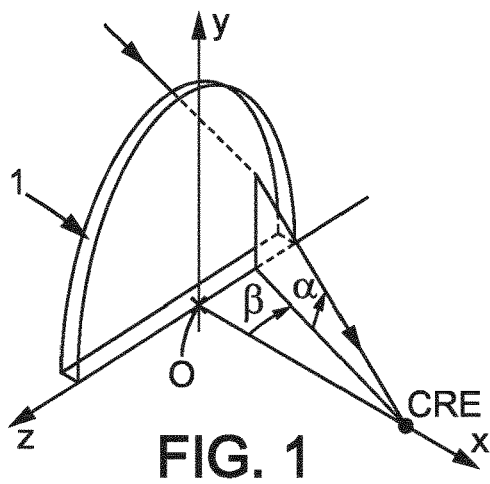
FIGS. 1 and 2 show, diagrammatically, optical systems of eye and lens and ray tracing from the center of rotation of the eye.
Figure 2:
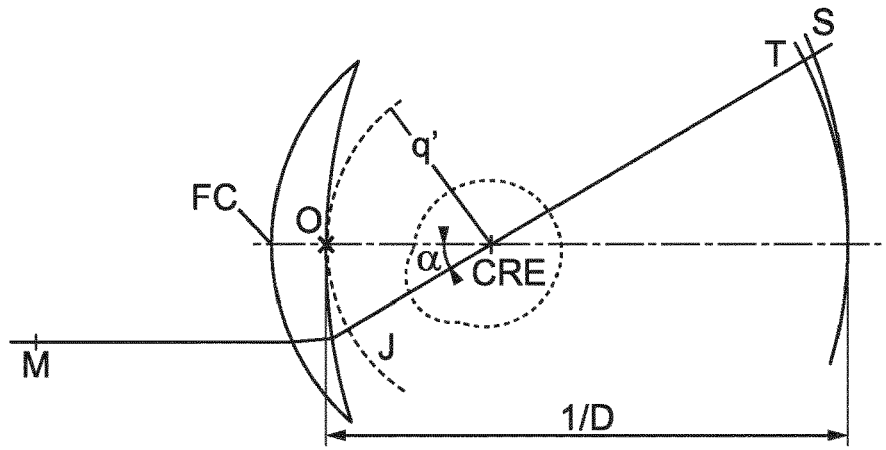

A "gaze direction" is identified by a couple of angle values $(\alpha,\beta)$, wherein said angles values are measured with regard to reference axes centered on the center of rotation of the eye, commonly named as "CRE". More precisely, FIG. 1 represents a perspective view of such a system illustrating parameters $\alpha$ and $\beta$ used to define a gaze direction. FIG. 2 is a view in the vertical plane parallel to the antero-posterior axis of the wearer's head and passing through the center of rotation of the eye in the case when the parameter $\beta$ is equal to 0. The center of rotation of the eye is labeled CRE. The axis CRE-F', shown on FIG. 2 in a dot-dash line, is the horizontal axis passing through the center of rotation of the eye and extending in front of the wearer—that is the axis CRE-F' corresponding to the primary gaze direction. The lens 1 is placed and centered in front of the eye such that the axis CRE-F' cuts the front surface of the lens on a point called the fitting cross, which is, in general, present on lenses to enable the positioning of lenses in a frame by an optician. The point of intersection of the rear surface of the lens and the axis CRE-F' is the point, O. A vertex sphere, which center is the center of rotation of the eye, CRE, and has a radius q'=O− CRE, intercepts the rear surface of the lens in a point of the horizontal axis. A value of radius q' of 25.5 mm corresponds to a usual value and provides satisfying results when wearing the lenses. Other value of radius q' may be chosen. A given gaze direction, represented by a solid line on FIG. 1, corresponds to a position of the eye in rotation around CRE and to a point J (see FIG. 2) of the vertex sphere; the angle β is the angle formed between the axis CRE-F' and the projection of the straight line CRE-J on the horizontal plane comprising the axis CRE-F'; this angle appears on the scheme on FIG. 1. The angle α is the angle formed between the axis CRE-J and the projection of the straight line CRE-J on the horizontal plane comprising the axis CRE-F'; this angle appears on the scheme on FIGS. 1 and 2. A given gaze view thus corresponds to a point J of the vertex sphere or to a couple (α,β). The more the value of the lowering gaze angle is positive, the more the gaze is lowering and the more the value is negative, the more the gaze is rising. In a given gaze direction, the image of a point M in the object space, located at a given object distance, is formed between two points S and T corresponding to minimum and maximum distances JS and JT, which would be the sagittal and tangential local focal lengths. The image of a point in the object space at infinity is formed, at the point F'. The distance D corresponds to the rear frontal plane of the lens.

For each gaze direction (α,β), a mean refractive power PPO(α,β), a module of astigmatism ASR(α,β) and an axis AXE(α,β) of this astigmatism, and a module of resulting (also called residual or unwanted) astigmatism ASR(α,β) are defined.

"Astigmatism" refers to astigmatism generated by the lens, or to residual astigmatism (resulting astigmatism) which corresponds to the difference between the prescribed astigmatism (wearer astigmatism) and the lens-generated astigmatism; in each case, with regards to amplitude or both amplitude and axis;

"Ergorama" is a function associating to each gaze direction the usual distance of an object point. Typically, in far vision following the primary gaze direction, the object point is at infinity. In near vision, following a gaze direction essentially corresponding to an angle α of the order of 35° and to an angle β of the order of 5° in absolute value towards the nasal side, the object distance is of the order of 30 to 50 cm. For more details concerning a possible definition of an ergorama, U.S. Pat. No. 6,318,859 may be considered. This document describes an ergorama, its definition and its modeling method. For a method of the invention, points may be at infinity or not. Ergorama may be a function of the wearer's ametropia. Using these elements, it is possible to define a wearer optical power and astigmatism, in each gaze direction. An object point M at an object distance given by the ergorama is considered for a gaze direction (α,β). An object proximity PROX is defined for the point M on the corresponding light ray in the object space as the inverse of the distance MJ between point M and point J of the vertex sphere:

$$ProxO = 1/MJ$$

This enables to calculate the object proximity within a thin lens approximation for all points of the vertex sphere, which is used for the determination of the ergorama. For a real lens, the object proximity can be considered as the inverse of the distance between the object point and the front surface of the lens, on the corresponding light ray.

For the same gaze direction (α,β), the image of a point M having a given object proximity is formed between two points S and T which correspond respectively to minimal and maximal focal distances (which would be sagittal and tangential focal distances). The quantity ProxI is called image proximity of the point M:

$$Pr\,oxI = \frac{1}{2}\left(\frac{1}{JT} + \frac{1}{JS}\right)$$

By analogy with the case of a thin lens, it can therefore be defined, for a given gaze direction and for a given object proximity, i.e. for a point of the object space on the corresponding light ray, an optical power, also called mean refractive power, PPO as the sum of the image proximity and the object proximity.

$$PPO = PROX + ProxI$$

The optical power is also called refractive power.

With the same notations, an astigmatism AST is defined for every gaze direction and for a given object proximity as:

$$AST = \left|\frac{1}{JT} - \frac{1}{JS}\right|$$

This definition corresponds to the astigmatism of a ray beam created by the lens.

The resulting astigmatism ASR is defined for every gaze direction through the lens as the difference between the actual astigmatism value AST for this gaze direction and the prescribed astigmatism for the same lens. The residual astigmatism (resulting astigmatism) ASR more precisely corresponds to module of the vectorial difference between actual (AST, AXE) and prescription data ($CYL_p$, $AXIS_p$).

When the characterization of the lens is of optical kind, it refers to the ergorama-eye-lens system described above. For simplicity, the term 'lens' is used in the description but it has to be understood as the 'ergorama-eye-lens system'. The values in optic terms can be expressed for gaze directions. Conditions suitable to determine of the ergorama-eye-lens system are called in the frame present invention "as-worn conditions".

"Acuity" refers to a measure of the spatial resolution of the visual processing system.

"Acuity loss" of a given equipment refers to the difference between the acuity measured for a wearer wearing the equipment and the acuity measured for the same wearer with the correction determined during a refraction examination.

"Contrast sensitivity" refers to the ability to distinguish between finer and and finer increments of light versus dark. The contrast sensitivity is, for example, measured according to a test of Pelli-Robson.

"Contrast sensitivity loss" of a given equipment refers to the difference between the contrast sensitivity measured for a wearer wearing the equipment and the contrast sensitivity measured for the same wearer with the correction determined during a refraction examination.

"Dynamic vision performance", also called "dynamic visual acuity" is the acuity of a wearer during head movements of the wearer. The dynamic vision performance is measured according to a dynamic visual acuity test.

"Dynamic vision performance loss" of a given equipment refers to the difference between the dynamic vision performance measured for a wearer wearing the equipment and the dynamic vision performance measured for the same wearer with the correction determined during a refraction examination.

"Sensitiveness of a wearer" refers to the rate of change of the visual performance parameter with respects to the geometrical features of the lens.

EXAMPLES

Figure 3:
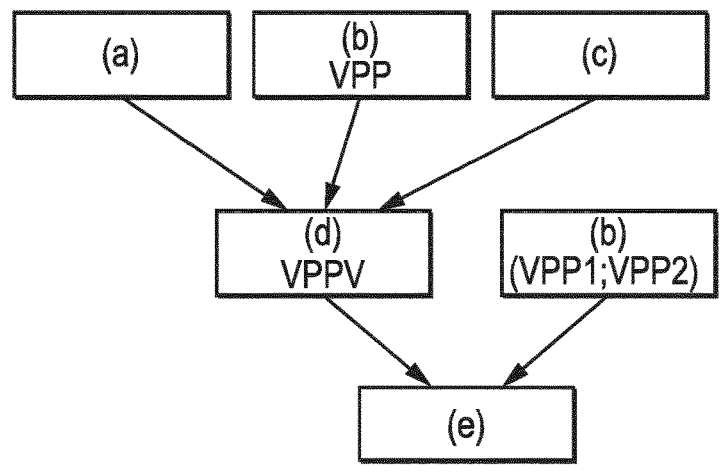
FIG. 3 shows a diagrammatic flowchart corresponding to the method of the present invention.

In hereunder examples, and as illustrated in FIG. 3 showing a diagrammatic flowchart, the method of the invention is implemented by computer means and allows evaluating an ophthalmic lens for a given wearer according to a visual performance parameter (VPP), the method comprising the following steps:
- step (a) of providing wearer's data for the given wearer, the wearer's data comprising at least prescription data, corresponding to box [(a)] of FIG. 3;
- step (b) of providing, for the visual performance parameter (VPP), corresponding to box [(b), VPP] of FIG. 3, and a visual performance parameter tolerance range (VPP1; VPP2) for the wearer, corresponding to box [(b), (VPP1;VPP2)] of FIG. 3;
- step (c) of providing an ophthalmic lens to be evaluated, the ophthalmic lens being characterized by opto-geometrical features, corresponding to box [(c)] of FIG. 3;
- step (d) of determining a value (VPPV) of the visual performance parameter (VPP) for the lens to be evaluated on the basis of a model, the model being a function of the wearer's data, of the opto-geometrical features of the evaluated lens and of at least a gaze direction of the given wearer, said step (d) corresponding to box [(d), VPPV] of FIG. 3; and
- step (e) of evaluating the ophthalmic lens by comparing the determined value (VPPV) of the visual performance parameter with the visual performance parameter tolerance range (VPP1; VPP2), corresponding to box [(e)] of FIG. 3.

In said examples, the visual performance parameter (VPP) is acuity loss, defined by acuity loss value $ACU(\alpha, \beta)$ expressed in logMAR and determined in as-worn conditions of the lens by the wearer.

In following examples 1 to 3, the visual performance parameter tolerance range (VPP1; VPP2), i.e. acuity loss tolerance range, is (0; 0.1), where VPP1 and VPP2 are expressed in logMAR. In addition, the model is a mathematical model simulating the lens to be evaluated worn by the wearer, the determined value (VPPV) of step (d) being computed on the basis of said mathematical model.

Example 1

The visual performance parameter is evaluated for single ophthalmic lens for a given wearer.

The visual performance parameter tolerance range (VPP1; VPP2) is not measured for the wearer.

One assumes that the maximum visual acuity of the wearer is 10/10 (0 logMAR). There is thus no measurement of the visual performance of the wearer with trial lenses.

In said example, the mathematical model of step (d) for calculating the acuity loss value is following: $ACU(\alpha_{FP}, \beta_{FP})$ is calculated for a fixation point $FP(\alpha_{FP}, \beta_{FP}, PROX_{FP})$ according to mean refractive power $PPO(\alpha, \beta)$ and to module of resulting astigmatism $ASR(\alpha, \beta)$ of the ophthalmic lens and to following equation:

$$ACU(\alpha_{FP},\beta_{FP}) = -\log(AC\%(\alpha_{FP},\beta_{FP})/100), \text{ where:}$$

$$AC\%(\alpha_{FP},\beta_{FP}) = 100 - 63 \times RPE(\alpha_{FP},\beta_{FP}) - 44.3 \times ASR(\alpha_{FP},\beta_{FP}) + 7.2 \times RPE(\alpha_{FP},\beta_{FP})^2 + 19.5 \times RPE(\alpha_{FP},\beta_{FP}) \times ASR(\alpha_{FP},\beta_{FP}) + ASR(\alpha_{FP},\beta_{FP})^2;$$

$$RPE(\alpha_{FP},\beta_{FP}) = PE(\alpha_{FP},\beta_{FP}), \text{when} PE(\alpha_{FP},\beta_{FP}) \geq 0; \text{ and};$$

$$RPE(\alpha_{FP},\beta_{FP}) = 0, \text{when} PE(\alpha_{FP},\beta_{FP}) < 0;$$

$$PE(\alpha_{FP},\beta_{FP}) = PPO(\alpha_{FP},\beta_{FP}) - MS(\alpha_{FP},\beta_{FP}) - PROX_{FP};$$

$MS(\alpha_{FP}, \beta_{FP})$ is the prescribed mean sphere value for the wearer, where $MS(\alpha_{FP}, \beta_{FP}) = SPH_p(\alpha_{FP}, \beta_{FP}) - [CYL_p(\alpha_{FP}, \beta_{FP})/2]$; $SPH_p(\alpha_{FP}, \beta_{FP})$ is the prescribed sphere and $CYL_p(\alpha_{FP}, \beta_{FP})$ is the prescribed astigmatism value $CYL_p$ for the $(\alpha_{FP}, \beta_{FP})$ gaze direction.

In the present example $(\alpha_{FP}, \beta_{FP}) = (0,0)$

The lens ordering parameters are following:
prescribed sphere, $SPH_p = 0.75$ D
prescribed astigmatism value, $CYL_p = -3.00$ D
prescribed axis, $AXIS_p = 95$ deg
pantoscopic angle of the lens=0 deg
wrap angle of the lens=0 deg The manufactured lens is defined by the following values, such values being for example measured by a focimeter at the center of the lens:
actual sphere value=0.85 D,
actual astigmatism value=−2.98 D,
actual axis=97 deg Sphere and Cylinder errors are computed, whereas:
sphereError=0.21 D
astigmatismError=0.21 D Assumption is made that PE and ASR are directly equal to sphereError and astigmatismError. This approximation is valid for gaze directions that are close to the optical axis of the lens.

One obtains:
PE=0.21 D
ASR=0.21 D

Acuity loss is calculated according to the here above mathematical model of step (d) for calculating the acuity loss value and one obtains:
AC %=78.4%
ACU=0.11 logMAR The lens exceeds the visual performance indicator threshold of VPP2=0.1 logMAR and is rejected.

According to ISO tolerances, the lens would have been accepted. Indeed, the difference between the prescribed sphere, respectively the prescribed cylinder, and the actual sphere value, respectively the actual cylinder value, is equal to 0.10 D, respectively 0.02 D, which is inferior to the ISO tolerance threshold of 0.12 D. Hence, the invention enables to evaluate an ophthalmic lens while taking into account data relevant for improving the wearer's visual comfort.

Example 2

The visual performance parameter is evaluated for single ophthalmic lens for a given wearer.

The visual performance parameter tolerance range (VPP1; VPP2) is not measured for the wearer.

In the present example $(\alpha_{FP}, \beta_{FP}) = (0,0)$.

One measures the visual performance of the wearer with trial lenses and one determines that the maximum visual acuity of the wearer is:

AcuityMax=16/10=−0.20 logMAR

One defines a personalized acuity model for the said wearer:
when subjected to a 0.25 D Sphere error, the acuity drops to 8/10=0.1 logMAR;
when subjected to a 0.25 D Cylinder error, the acuity drops to 10/10=0.0 logMAR.

The mathematical model of step (d) for calculating the acuity loss value is a personalized acuity loss equation according to following:

$$AC\% = 100 - k_1 \cdot RPE - k_2 \cdot ASR$$

Where:

$$k_1 = 100 \cdot (16/10 - 8/10)/(16/10)/0.25 = 200$$

$$k_2 = 100 \cdot (16/10 - 10/10)/(16/10)/0.25 = 150$$

Then, $AC\% = 100 - 200 \cdot RPE - 150 \cdot ASR$.

The lens ordering parameters are following:
prescribed sphere, $SPH_p = -2.25$ D
prescribed astigmatism value, $CYL_p = -2.00$ D
prescribed axis, $AXIS_p = 55$ deg
pantoscopic angle of the lens=0 deg
wrap angle of the lens=0 deg
The manufactured lens is defined by the following values, such values being for example measured by a focimeter at the center of the lens:
actual sphere value=−2.16 D,
actual astigmatism value=−1.93 D,
actual axis=53 deg Sphere and Cylinder errors are computed, whereas:
sphereError=0.20 D
astigmatismError=0.15 D
Assumption is made that PE and ASR are directly equal to sphereError and astigmatismError. This approximation is valid for gaze directions that are close to the optical axis of the lens.
One obtains:
PE=0.20 D
ASR=0.15 D
Acuity loss is calculated according to the here above mathematical model of step (d) for calculating the acuity loss value and one obtains:
AC %=36.5%
ACU=0.44 logMAR
The lens exceeds the visual performance indicator threshold of VPP2=0.1 logMAR and is rejected.

Example 3

One evaluates an optical equipment comprising a frame and left and right ophthalmic lenses mounted in said frame for a given wearer.
Each ophthalmic lens mounted in said frame can be evaluated as in Example 1.
The visual performance parameter (VPP) can be evaluated monocularly, binocularly or both monocularly and binocularly.
The visual performance parameter tolerance range (VPP1; VPP2), i.e. acuity loss tolerance range, is (0; 0.1), where VPP1 and VPP2 are expressed in logMAR.
One determines the monocular acuity loss according to a mathematical model as a function of Power Error (PE) and Resulting Astigmatism (ASR), separately for each eye:

$$ACU\_left = 0.12 \text{ logMAR}$$

$$ACU\_right = 0.13 \text{ logMAR}$$

From a monocular point of view, both acuity losses for the left and right eye are outside of the visual performance parameter range.
One can determine the binocular acuity loss ACU_bino according to the following model:

$$ACU\_Snellen\_left = 10\hat{\ }(-ACU\_left)$$

$$ACU\_Snellen\_right = 10\hat{\ }(-ACU\_right)$$

$$ACU\_Snellen\_bino = (ACU\_Snellen\_right\hat{\ }7.3 + ACU\_Snellen\_left\hat{\ }7.3)\hat{\ }(1/7.3)$$

$$ACU\_bino = -\log 10(ACU\_Snellen\_bino)$$

where X^A means X to the A power or X exponent A.
The computed binocular acuity loss is:

$$ACU\_bino = 0.08 \text{ logMAR},$$

which is within the visual performance parameter range.
So from the binocular point of view, the equipment is accepted.

Example 4

The model is personalized for the wearer thanks to measuring his sensitiveness to the visual performance parameter.
Said personalization can be based on following measurements:
During usual refraction measurement, one records levels on wearer visual performance criteria and tried prescriptions. Said data can be used with a statistical regression to evaluate personalized model of wearer visual performance.
During usual refraction measurement, finding the optimized prescription. Afterwards, one uses additional trials with addition of errors on optimized prescription, and one makes measurements of wearer visual performance criteria. Said data can be used with a statistical regression to evaluate personalized model of wearer visual performance.
According to an example, the optimized prescription is SPH=−2.00; CYL=−0.75; AXIS=90°, with an acuity of 8/10; one further tries SPH=−1.50; CYL=−0.75; AXIS=90°, and one notes an acuity level of 6.5/10; one further tries SPH=−2.00; CYL=−0.25; AXIS=90°, and one notes an acuity level of 6/10.
During usual refraction measurement, finding the optimized prescription. Afterwards, one looks for the maximum error the wearer can tolerate on optimized prescription until wearer visual performance criteria exceeds a given threshold. Said data can be used with a statistical regression to evaluate personalized model of wearer visual performance.
According to an example, the optimized prescription is SPH=−2.00; CYL=−0.75; AXIS=90°, with an acuity of 8/10; one defines an acuity limit of 6/10;
One notes SPH=−1.29; CYL=−0.75; AXIS=90°, for which wearer reaches the acuity level of 6/10
One notes SPH=−2.00; CYL=−0.23; AXIS=90°, for which wearer reaches the acuity level of 6/10
During usual refraction measurement, one alternates degraded optimized prescription and optimized prescription, and one notes when wearer sees a difference on wearer visual performance criteria. One uses this maximum tolerated error for a statistical regression to evaluate personalized model of wearer visual performance
According to an example, the optimized prescription is SPH=−2.00; CYL=−0.75; AXIS=90°, with an acuity of 8/10;
One Wearer falls at acuity 7/10 for SPH=−1.73; CYL=−0.75; AXIS=90° Wearer falls at acuity 7/10 for SPH=−2.00; CYL=−0.52; AXIS=90°.

Based on said measurements, one defines the model.

Example 5

The visual performance parameter is evaluated for single ophthalmic lens for a given wearer.

The visual performance parameter tolerance range (VPP1; VPP2) is measured for the wearer.

During eye examination, by asking the wearer, it is established that blur becomes bothersome when acuity loss reaches 0.2 logMAR.

So the visual performance parameter tolerance range (VPP1; VPP2) is set to (0; 0.2) where VPP1 and VPP2 are expressed in logMAR.

The invention has been described above with the aid of embodiments without limitation of the general inventive concept; in particular acuity loss in not the only visual performance parameter that can be chosen for evaluating an ophthalmic lens for a given wearer according to a visual performance parameter in the frame of the present invention; contrast sensitivity loss or dynamic vision performance loss can also be chosen, as well as other suitable visual performance parameters.

The invention claimed is:

1. A method implemented by computer means for evaluating an ophthalmic lens for a given wearer according to a visual performance parameter (VPP), the method comprising the steps of:
    step (a) of providing wearer's data for the given wearer, the wearer's data comprising at least prescription data;
    step (b) of providing, for the visual performance parameter (VPP), a visual performance parameter tolerance range (VPP1; VPP2) for the wearer;
    step (c) of providing an ophthalmic lens to be evaluated, the ophthalmic lens being characterized by opto-geometrical features;
    step (d) of determining a value (VPPV) of the visual performance parameter (VPP) for the lens to be evaluated on the basis of a wearer visual performance model, the model being a function of the provided wearer's data, including the provided prescription data, of the opto-geometrical features of the evaluated lens and of at least a gaze direction of the given wearer; and
    step (e) of evaluating the ophthalmic lens by comparing the determined value (VPPV) of the visual performance parameter with the visual performance parameter tolerance range (VPP1; VPP2), wherein
    the method is implemented when performing a quality check of the ophthalmic lens; and
    the visual performance parameter (VPP) is acuity loss defined by acuity loss value ACU($\alpha$, $\beta$) expressed in logMAR and determined in as-worn conditions of the lens by the wearer, and the visual performance parameter tolerance range (VPP1; VPP2) is (0; 0.2) with VPP1 and VPP2 being expressed in logMAR.

2. The method for evaluating an ophthalmic lens as claimed in claim 1, wherein the wearer visual performance model is a mathematical model simulating the lens to be evaluated worn by the wearer, the determined value (VPPV) of step (d) being computed on the basis of said mathematical model.

3. The method for evaluating an ophthalmic lens as claimed in claim 1, wherein step (c) comprises the sub-steps of providing a lens blank or a semi-finished lens blank, and surfacing the lens blank or the semi-finished lens blank as a function of the prescription data so as to obtain the ophthalmic lens to be evaluated.

4. The method for evaluating an ophthalmic lens as claimed in claim 1, wherein step (c) comprises a sub-step of measuring the ophthalmic lens to be evaluated so as to determine the opto-geometrical features relevant for the computing step (d).

5. The method for evaluating an ophthalmic lens as claimed in claim 1, wherein the evaluating step (e) comprises the sub-steps of accepting the ophthalmic lens if the determined value of the visual performance parameter (VPPV) falls within the visual performance parameter tolerance range (VPP1; VPP2), and rejecting the ophthalmic lens if not.

6. The method for evaluating an ophthalmic lens as claimed in claim 1, wherein the wearer's data further comprises wearing condition data.

7. The method for evaluating an ophthalmic lens as claimed in claim 1, wherein step (b) of providing a visual performance parameter tolerance range (VPP1; VPP2) comprises a sub-step of measuring.

8. The method for evaluating an ophthalmic lens as claimed in claim 1, wherein the model is personalized for the wearer by measuring sensitiveness to the visual performance parameter.

9. A method of evaluating an optical equipment comprising a frame and left and right ophthalmic lenses mounted in said frame for a given wearer, wherein said method comprises a step of evaluating each of the mounted ophthalmic lenses according to the method as claimed in claim 1.

10. An industrial assembly for manufacturing an ophthalmic lens adapted to a given wearer, the assembly comprising:
    an ordering system defining manufacturing criteria on the basis of wearer's data comprising at least prescription data;
    a manufacturing system for manufacturing an ophthalmic on the basis of the manufacturing criteria; and
    the evaluation system for the execution of a method according to claim 1 for evaluating an ophthalmic lens manufactured by the manufacturing system.

11. A non-transitory computer readable medium having instructions stored therein which, when executed by a processor, causes the processor to perform a method according to claim 1.

12. The method for evaluating an ophthalmic lens as claimed in claim 1, wherein step (c) comprises a sub-step of measuring the ophthalmic lens to be evaluated so as to determine the opto-geometrical features relevant for the computing step (d) by measuring the mean refractive power PPO for each $\alpha$ and $\beta$ and the module of resulting astigmatism ASR for each $\alpha$ and $\beta$ of the ophthalmic lens, where $\alpha$ and $\beta$ are gaze directions passing by the center of rotation of the eye (CRE), a being lowering angle gaze direction in degree and $\beta$ being an azimuth angle gaze direction in degree.

13. The method for evaluating an ophthalmic lens as claimed in claim 1, wherein the visual performance parameter tolerance range (VPP1; VPP2) is (0; 0.1).

14. The method for evaluating an ophthalmic lens as claimed in claim 1, wherein the visual performance parameter tolerance range (VPP1; VPP2) is (0; 0.05).

* * * * *